(12) United States Patent
Geisler

(10) Patent No.: US 11,315,417 B2
(45) Date of Patent: Apr. 26, 2022

(54) METHOD, DEVICE AND SYSTEM FOR WRONG-WAY DRIVER DETECTION

(71) Applicant: Robert Bosch GmbH, Stuttgart (DE)

(72) Inventor: Simon Geisler, Heilbronn (DE)

(73) Assignee: Robert Bosch GmbH, Stuttgart (DE)

( * ) Notice: Subject to any disclaimer, the term of this patent is extended or adjusted under 35 U.S.C. 154(b) by 629 days.

(21) Appl. No.: 16/097,754

(22) PCT Filed: Apr. 11, 2017

(86) PCT No.: PCT/EP2017/058623
§ 371 (c)(1),
(2) Date: Oct. 30, 2018

(87) PCT Pub. No.: WO2017/211483
PCT Pub. Date: Dec. 14, 2017

(65) Prior Publication Data
US 2020/0402396 A1    Dec. 24, 2020

(30) Foreign Application Priority Data

Jun. 7, 2016   (DE) .......................... 102016210023.8

(51) Int. Cl.
*G08G 1/056* (2006.01)
*G08G 1/16* (2006.01)

(52) U.S. Cl.
CPC ............ *G08G 1/056* (2013.01); *G08G 1/166* (2013.01)

(58) Field of Classification Search
CPC .. G01C 21/30; G01C 21/3697; G08G 1/0112; G08G 1/0133; G08G 1/0145; G08G 1/056; G08G 1/164; G08G 1/166
See application file for complete search history.

(56) References Cited

U.S. PATENT DOCUMENTS

| 8,754,782 | B2 * | 6/2014 | Tagawa | .................. | G08G 1/075 |
| | | | | | 340/905 |
| 8,947,259 | B2 * | 2/2015 | Tagawa | .............. | G01C 21/3697 |
| | | | | | 340/905 |

(Continued)

FOREIGN PATENT DOCUMENTS

| CN | 102547244 A | 7/2012 |
| CN | 202435528 U | 9/2012 |

(Continued)

OTHER PUBLICATIONS

International Search Report for PCT/EP2017/058623, dated Aug. 10, 2017.

(Continued)

*Primary Examiner* — Sisay Yacob
(74) *Attorney, Agent, or Firm* — Norton Rose Fulbright US LLP; Gerard Messina

(57) ABSTRACT

A method for wrong-way driver detection, including a step of reading in position data via an interface, the position data representing a measured position of a vehicle, a step of reading in inaccuracy data representing an inaccuracy of the position data, a step of reading in map data mapping road segments negotiable by the vehicle, and a step of ascertaining at least one plausible road segment based on the position data, the inaccuracy data and the map data, using a particle filter, the plausible road segment representing a road segment to which an instantaneous position of the vehicle may be assigned.

13 Claims, 8 Drawing Sheets

(56) References Cited

U.S. PATENT DOCUMENTS

| | | |
|---|---|---|
| 2012/0290150 A1 | 11/2012 | Doughty et al. |
| 2013/0044009 A1* | 2/2013 | Tagawa ............... G08G 1/0962 340/995.28 |
| 2013/0304374 A1 | 11/2013 | Lee et al. |
| 2014/0244146 A1* | 8/2014 | Tagawa ............... G08G 1/0962 701/117 |
| 2016/0003630 A1* | 1/2016 | Higuchi ............... G08G 1/16 701/41 |

FOREIGN PATENT DOCUMENTS

| | | |
|---|---|---|
| CN | 102792350 A | 11/2012 |
| CN | 103021186 A | 4/2013 |
| CN | 106022243 A | 10/2016 |
| DE | 102011120497 A1 | 6/2012 |
| DE | 102012208974 A1 | 12/2012 |
| EP | 2800883 B1 | 8/2016 |
| JP | 2009140008 A | 6/2009 |
| JP | 2014034251 A | 2/2014 |
| JP | 2016081392 A | 5/2016 |

OTHER PUBLICATIONS

Tao Junli et al., "Wrong Roadway Detection for Multi-lane Roads", Aug. 27, 2013, Network and Parallel Computing; Lecture Notes in Computer Science; Springer International Publishing, pp. 50-58, XP047038828.

F. Peyet et al., "Lane-level positioning for cooperative systems using EGNOS and enhanced digital maps", Mar. 31, 2008, XP055393844.

Schindler Andreas, "Vehicle self-localization with high-precision digital maps", 2013 IEEE Intelligent Vehicles Symposium (I V), IEEE, Jun. 23, 2013, pp. 141-146, XP032502004.

* cited by examiner

METHOD, DEVICE AND SYSTEM FOR WRONG-WAY DRIVER DETECTION

BACKGROUND INFORMATION

The present invention is directed to a device and to a method for wrong-way driver detection. The present invention also relates to a computer program.

Wrong-way drivers ("ghost drivers") cause at least considerable property damage in the event of an accident. The detection based only on the navigation device (road class and direction) is too late in most instances, i.e., the wrong-way driver is already traveling (at a high driving speed and with a high probability of a collision) on the wrong lane.

SUMMARY

The present invention provides a method, furthermore a device and a system for wrong-way driver detection, and finally a corresponding computer program. Advantageous refinements of and improvements on the device are described herein.

A, for example, cloud-based wrong-way driver warning may advantageously be implemented with a detection which is adapted specifically to the case, using a particle filter.

A method for wrong-way driver detection includes the following steps:

reading in position data via an interface, the position data representing a measured position of a vehicle;

reading in inaccuracy data representing an inaccuracy of the position data;

reading in map data mapping road segments negotiable by the vehicle; and ascertaining at least one plausible road segment based on the position data, the inaccuracy data and the map data, using a particle filter, the plausible road segment representing a road segment to which an instantaneous position of the vehicle may be assigned.

The vehicle may be a road vehicle. Wrong-way driving may be understood to mean a drive of the vehicle on a road counter to a prescribed driving direction. The measured position may have been measured using a sensor situated in the vehicle. The instantaneous position may represent a position estimated using the particle filter, which may be used as an actual position of the vehicle. The instantaneous position may be used instead of the measured position for detecting a wrong-way drive of the vehicle. The map data may be read out from a digital map, for example. The plausible road segment may be understood to mean a road segment for which it is assumed, after evaluation of the present data, that the vehicle is situated thereon.

The method may include a step of determining a wrong-way driving signal, using the at least one plausible road segment. The wrong-way driving signal may indicate whether or not the vehicle is driving the wrong way. For example, the wrong-way driving signal may only be provided when a wrong-way drive is assumed.

In the step of ascertaining, a plurality of particles may be determined. The plurality of particles may be distributed around the measured position of the vehicle mapped by the position data, and each of the particles may represent an assumed position of the vehicle and a weighting assigned to the assumed position. The plurality of particles may be determined using a method using known particle filters. The particles may have different assumed positions which, for example, are grouped around the measured position. Such particles may be processed well using the described particle filter.

In the step of ascertaining, a plurality of shifted particles may be determined, using the plurality of particles and the inaccuracy data. The at least one plausible road segment may be ascertained based on the plurality of shifted particles. Advantageously, the inaccuracies may be used for correcting the originally determined particles.

In the step of ascertaining, map-based parameters may be determined for the particles, using the map data. The at least one plausible road segment may be ascertained based on the map-based parameters. A map-based parameter may indicate, for example, whether a particle to which the parameter is assigned is situated on a road segment. Advantageously, a plausibility of the individual particles may be checked, using the map data.

For this purpose, new weightings of the plurality of particles or of the plurality of shifted particles may be determined in the step of ascertaining, using the map-based parameters. The more plausible a particle appears, taking the map data into consideration, the higher the particle may be weighted.

In the step of ascertaining, irrelevant particles may be eliminated from the plurality of particles or the plurality of shifted particles. In this way, the accuracy of the method may be increased.

Advantageously, the plurality of particles or the plurality of shifted particles may be interpreted to ascertain the at least one plausible road segment. As a result of the interpretation, values assigned to the individual particles, such as the weighting or the map-based parameters, may be evaluated.

In the step of reading in, the position data may be read in via an interface of a so-called processor cloud. This enables a cloud-based solution.

A corresponding device for wrong-way driver detection is configured to carry out steps of the described method in corresponding units. For example, such a device may include a read-in unit which is designed to read in position data via an interface, the position data representing a measured position of a vehicle, a read-in unit which is designed to read in inaccuracy data representing an inaccuracy of the position data, a read-in unit which is designed to read in map data mapping road segments negotiable by the vehicle, and an ascertainment unit which is designed to ascertain at least one plausible road segment based on the position data, the inaccuracy data and the map data, using a particle filter, the plausible road segment representing a road segment to which an instantaneous position of the vehicle may be assigned. Accordingly, the device may include the particle filter.

A corresponding system for wrong-way driver detection includes at least one transmitter, which is situatable or situated in a vehicle and designed to emit position data, and a described device for wrong-way driver detection, which is designed to receive the position data emitted by the at least one transmitter, for example via a wireless connection.

A further system for wrong-way driver detection includes at least one transmitter, which is situatable or situated in a vehicle and designed to emit position data, the position data representing a measured position of a vehicle, and at least one receiver unit, which is situatable or situated in a vehicle and designed to receive data of a device, which according to the approach described here for wrong-way driver detection is designed to receive the position data emitted by the at least one transmitter.

The described method may be implemented in software or hardware or in a mixed form made up of software and hardware, for example in a device.

For this purpose, the device may include at least one processing unit for processing signals or data, at least one memory unit for storing signals or data and/or at least one communication interface for reading in or outputting data, which are embedded into a communication protocol. The processing unit may be a signal processor, a microcontroller or the like, for example, it being possible for the memory unit to be a Flash memory, an EPROM or a magnetic memory unit. The communication interface may be designed to read in or output data wirelessly and/or in a wire-bound manner, a communication interface which is able to read in or output wire-bound data being able to read these data in, for example electrically or optically, from a corresponding data transmission line or output these into a corresponding data transmission line.

A device in the present invention may be understood to mean an electrical device which processes sensor signals and outputs control and/or data signals as a function thereof. The device may include an interface which may be designed as hardware and/or software. In the case of a hardware design, the interfaces may, for example, be part of a so-called system ASIC which includes a wide variety of functions of the device. However, it is also possible for the interfaces to be separate integrated circuits, or to be at least partially made up of discrete elements. In the case of a software design, the interfaces may be software modules which are present on a microcontroller, for example, in addition to other software modules.

In addition, a computer program product or computer program is advantageous, having program code which may be stored on a machine-readable carrier or memory medium such as a semiconductor memory, a hard disk memory or an optical memory, and which is used to carry out, implement and/or activate the steps of the method according to one of the specific embodiments described above, in particular if the program product or program is executed on a computer or a device.

Exemplary embodiments of the approach described herein are shown in the figures and are described in greater detail below.

DETAILED DESCRIPTION OF EXAMPLE EMBODIMENTS

Figure 1:
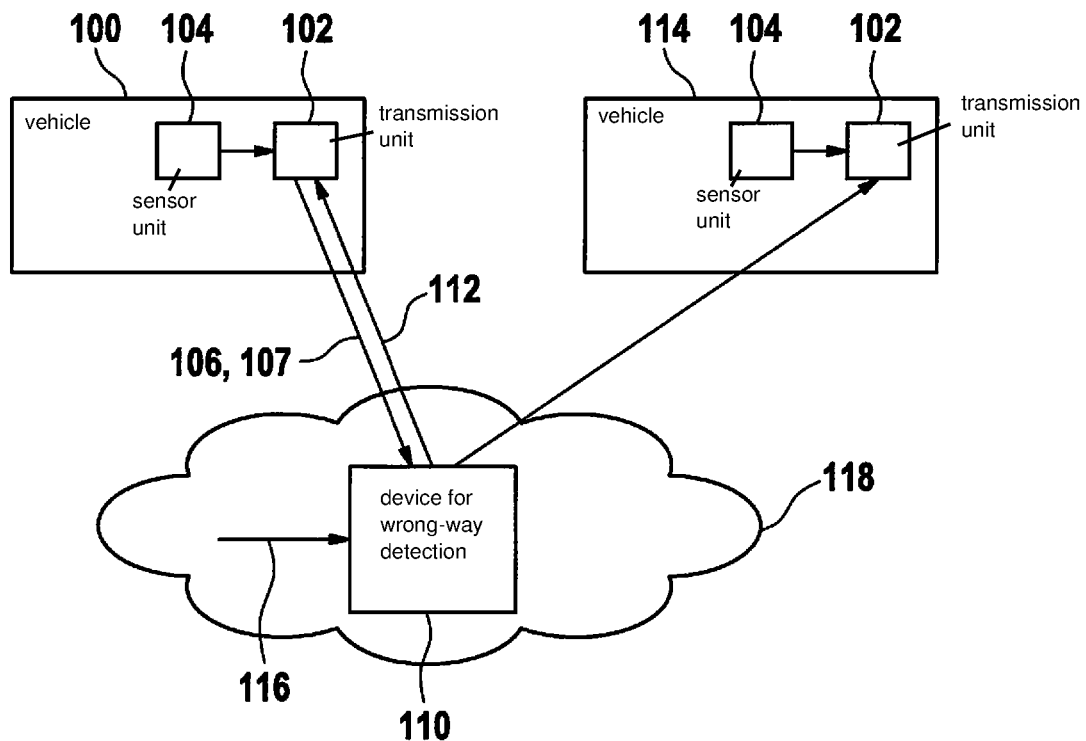
FIG. 1 shows a system for wrong-way driver detection according to one exemplary embodiment.

In the following description of favorable exemplary embodiments of the present invention, identical or similar reference numerals are used for similarly acting elements shown in the different figures, and a repeated description of these elements is dispensed with.

FIG. 1 shows a system for wrong-way driver detection according to one exemplary embodiment. The system includes a vehicle 100, which includes a transmission unit 102 designed to wirelessly emit measuring data 106, collected using at least one sensor unit 104 situated in vehicle 100, to a device 110 for wrong-way driver detection. Device 110 is designed to edit measuring data 106 into edited data and to further process the edited data, using a particle filter, to generate and emit a wrong-way driving signal 112. According to one exemplary embodiment, wrong-way driving signal 112 indicates that vehicle 100 whose measuring data 106 were processed is presently driving the wrong way. According to this exemplary embodiment, both transmission unit 102 of vehicle 100 and a transmission unit 102 of a further vehicle 114 are designed to receive wrong-way driving signal 112 and, in response to a reception of wrong-way driving signal 112, to activate a warning unit of the respective vehicle 100, 114 which, for example, warns a driver of the respective vehicle 100, 114 about the wrong-way drive or, according to one exemplary embodiment, intervenes in an at least semi-automatic control, for example of a braking system or steering system, of the respective vehicle 100, 114. According to different exemplary embodiments, transmission unit 102 may only be designed as a transmitter or as a transceiver unit.

According to one exemplary embodiment, measuring data 106 include position data which were detected using a position determination unit of vehicle 100 and map an instantaneous position of vehicle 100. According to one further exemplary embodiment, measuring data 106 furthermore include movement data, which were detected, for example, using at least one acceleration sensor of vehicle 100 and include pieces of information concerning an instantaneous movement of vehicle 100, for example pieces of information concerning a driving direction, a longitudinal acceleration, a transverse acceleration, or concerning a rotation of the vehicle about a vehicle axis.

According to one exemplary embodiment, inaccuracy data 107, which map an inaccuracy of the position data, are transmitted in addition to the measuring data 106.

According to one exemplary embodiment, device 110 is designed to read in map data 116 which map a road network negotiable by vehicle 100. According to one exemplary embodiment, map data 116 include, for example, pieces of information about route sections of the road network. According to one exemplary embodiment, map data 116, with respect to each route section, furthermore include at least one parameter which, for example, defines a driving direction specification for the respective route section or a course of the respective route section. For example, it may be defined via the parameter whether the route section extends straight or follows a curve. According to one specific embodiment, device 110 includes a memory unit in which map data 116 are stored.

According to one exemplary embodiment, device 110 is designed to use the particle filter in order to ascertain a plausible road segment for which it is assumed that vehicle 100 is situated thereon, using the position data, inaccuracy data 107 and map data 116. For example, using a driving direction parameter assigned to the road segment, it may be determined whether vehicle 100 is a vehicle driving the wrong way. If this is the case, wrong-way driving signal 112 is provided according to one exemplary embodiment.

According to one exemplary embodiment, device 110 is, or functional blocks of device 110 are, situated or implemented in a cloud 118.

The described approach may be used in addition or as an alternative to a variety of methods for detecting a wrong-way driver in which, e.g., a video sensor system is used to detect the passing of a "do not enter" sign or the use of a digital map in conjunction with a navigation is utilized to identify a detection of a wrong driving direction on a route section which is only negotiable in one direction. Furthermore, the approach may be combined with wireless methods, which detect wrong-way drivers with the aid of infrastructure, such as markers in the roadway or on the roadside.

In addition to detecting a wrong-way driver, the described approach offers many options for responding to a wrong-way driver. Examples include the warning of the wrong-way driver directly via a display or acoustic instructions. It is also possible to use methods by which other drivers in the vicinity of a wrong-way driver are warned, e.g., via vehicle-to-vehicle communication or with the aid of mobile communication. Furthermore, it is possible to warn other road users via variable message signs mounted along the roadside. It is also possible for an intervention in the engine control unit or brake of the vehicle 100 driving the wrong way to take place.

The described approach makes it possible to detect a wrong-way driver and to warn other road users in his or her vicinity in a timely manner, for which only very little time is available.

The described approach applies to a wrong-way driver detection with a client-server solution. A client shall be understood to mean a device, situated on or in a motor vehicle, which has an Internet connection and at least access to position coordinates. For example, it may be transmission unit 102. Transmission unit 102 may be a smart phone, for example. Sensor unit 104 may be integrated into transmission unit 102. In this way, wrong-way driver-specific server-client communication may be implemented with a smart phone as an exemplary client. The smart phone may be connected via a mobile communication network with the aid of a gateway (PDN_GW) to the Internet, in which device 110 may be situated, for example in the form of a server.

From the possible functionalities of a wrong-way driver warning using a client-server solution, the following key problem areas arise for this technology, which are addressed by the approach described here:

a) False Positive Reduction

False positives, i.e., misdetections in the case of correct driving, must be reduced as much as possible, or completely avoided, in the case of a driver warning and/or an active intervention. Depending on the warning concept, the standards up to ASIL A must be met.

b) Time-Critical Execution of the Trigger Chain

To keep the risk for other road users originating from a wrong-way driver as low as possible, an intervention and/or warning should take place as quickly as possible. This means, the entire functional chain from the detection of a critical situation, through the detection of a wrong-way driver, to the intervention or warning should be run through in a preferably short time period. The utilization and thus the necessary performance capability of the server, for example of device 110, during a comprehensive use of this function plays a very important role. In addition to the trigger time, the economic efficiency also represents an important sub-aspect.

c) Communication, Data Efficiency and Power Consumption

The communication and the power consumption must be as efficient and as low as possible, especially for mobile devices, to achieve an acceptable rechargeable battery operating time. The overloading of a mobile communication cell or other wireless communication unit also has to be suppressed by a data-efficient communication. In addition, the data volume and the associated costs have to be limited to the extent possible. The efficiency of the communication is also an extremely important factor on the server side for reasons of processing performance.

The described approach covers especially the key areas a) "false positive reduction" and b) "time-critical execution of the trigger chain", but c) "communication, data efficiency and power consumption" is also possibly influenced. The detection of wrong-way drivers in cloud 118, based on commercially available smart phone and connectivity control unit sensor systems, is no trivial undertaking.

Figure 2:
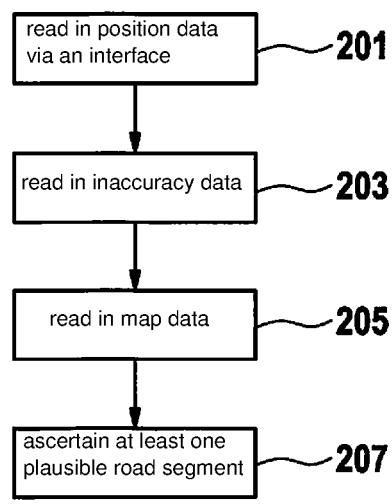
FIG. 2 shows a flow chart of a method for wrong-way driver detection according to one exemplary embodiment.

FIG. 2 shows a flow chart of a method for wrong-way driver detection according to one exemplary embodiment. For example, the method may be carried out using units of the device shown in FIG. 1 for wrong-way driver detection.

The method includes a step 201 in which position data are read in via an interface. The position data represent a measured position of a vehicle. In a step 203, inaccuracy data are read in, which represent an inaccuracy of the position data, and in a step 205, map data are read in, which map the road segments negotiable by the vehicle. In a step 207, at least one plausible road segment representing a road segment to which an instantaneous position of the vehicle may be assigned is ascertained based on the position data, the inaccuracy data and the map data, and using a particle filter. According to one exemplary embodiment, a wrong-way driving signal indicating a wrong-way drive of the vehicle is generated, using the plausible road segment.

It is not crucial for the wrong-way driver detection to know which route the wrong-way driver traveled. The information which is required is mainly where the wrong-way driver is presently situated, and whether he or she is traveling a road counter to the driving direction. For this ascertainment, the history is required, of course, which, however, is not part of the problem, but rather the path to the result.

Based on these circumstances, a method based on a particle filter is introduced. Similarly to the Kalman filter, the particle filter may be used for systems which are subject to a hidden Markov chain characteristic, i.e., a Markov chain with unobserved states.

Figure 3:
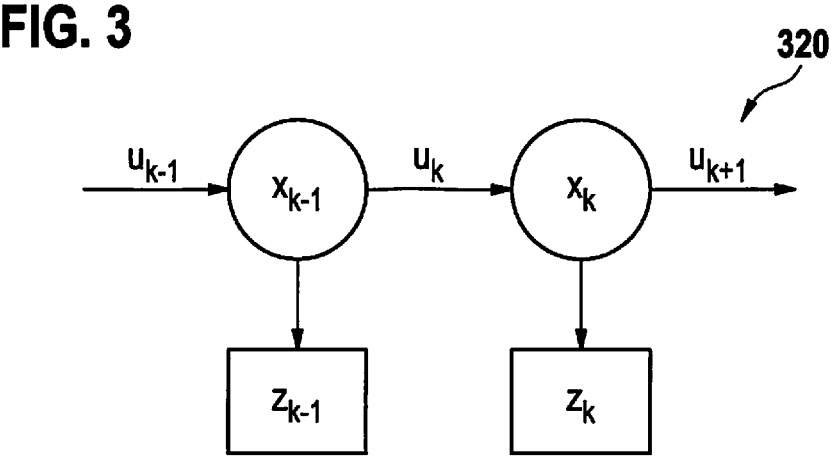
FIG. 3 shows a hidden Markov chain model.

FIG. 3 shows a hidden Markov chain model 320 including state x and observation z at times k and k−1.

This means, the state of a system cannot be measured directly, but may be estimated based on other observations. In this case, the position and thus the instantaneous road must be estimated. For this purpose, the following equation must be solved:

$$p(x_k|z_{0:k},u_{0:k})=\eta \cdot g(z_k|x_k,z_{0:k-1},u_{0:k})\pi(x_k|z_{0:k-1},u_{0:k})$$

The state at point in time k is described hereafter with $x_k$, and the previous states are summarized with $x_{0:k-1}=(x_0, \ldots, x_{k-1})$. Analogously to x, this convention also applies to control variables u and observations u. $\eta$ describes a normalization term, which hereafter, however, is not of great importance. This equation may be simplified to the following equation:

$$p(x_k|z_{0:k}, u_{0:k}) = \eta \cdot g(z_k|x_k) \int_{x_{k-1}} f(x_k|x_{k-1}, u_k) p(x_{k-1}|z_{0:k}, u_{0:k}) dx_{k-1}$$

And this is described in two steps: the prediction step $$\pi(x_k|z_{0:k-1}, u_{0:k}) = \int_{x_{k-1}} \underbrace{f(x_k|x_{k-1}, u_k)}_{motion} p(x_{k-1}|z_{0:k-1}, u_{0:k}) dx_{k-1}$$

and the weighting term:

$$p(x_k|z_{0:k}, u_{0:k}) = \eta \cdot \underbrace{g(z_k|x_k, u_k)}_{observations} \pi(x_k|z_{0:k-1}, u_{0:k}).$$

In the case of a particle filter, the integral is solved via the probability distributions using a numerical approximation $$\pi(x) = \sum_{j=1}^{J} w^{[j]} \delta(x - x^{[j]})$$

and Monte Carlo methods. $w^{[j]}$ describes the weight/the probability of each jth particle. A set of particles is $$X = \{\langle x^{[j]}, w^{[j]} \rangle\}_{j=1,\ldots,J}$$

described with.

In this way, each particle has the weight $w^{[j]}$ and the state $x^{[j]}$.

Figure 4:
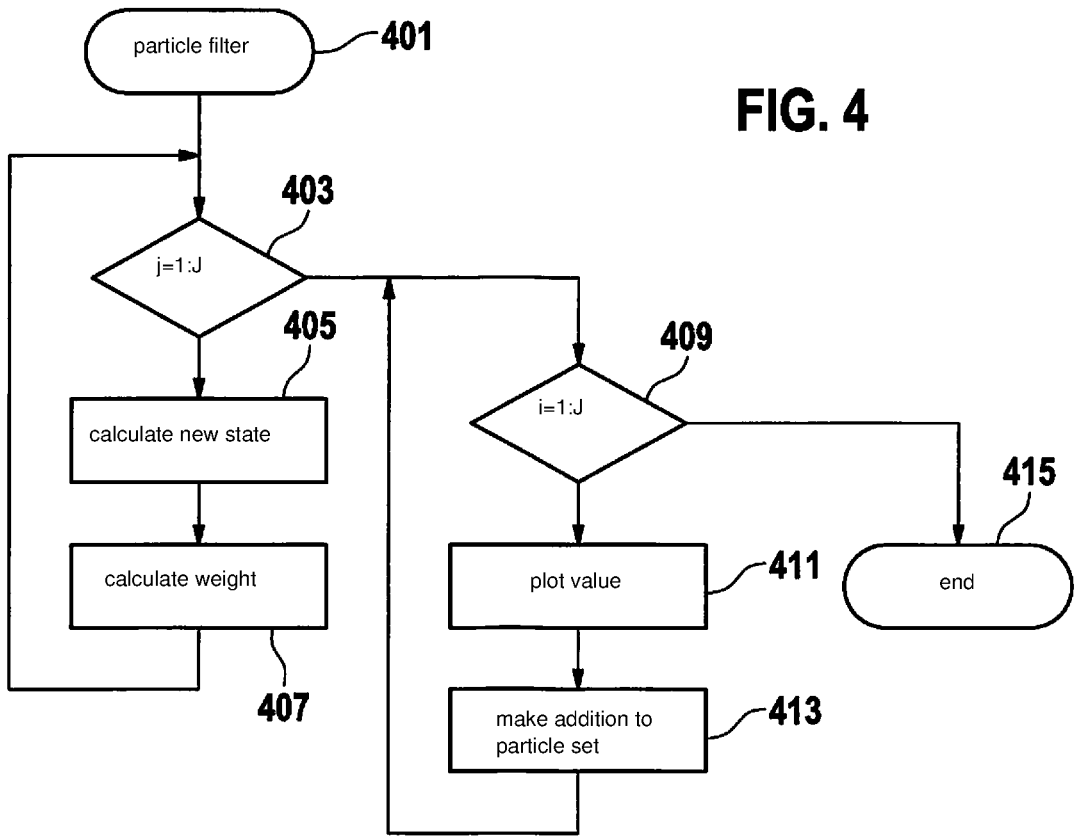
FIG. 4 shows a sequence of a particle filter process according to one exemplary embodiment.

FIG. 4 shows the sequence of a particle filter process according to one exemplary embodiment. For this purpose, FIG. 4 shows a hidden Markov chain model having state x and observation z at times k and k−1.

A large portion of the work is to find a suitable function for $$\underbrace{f(x_k|x_{k-1}, u_k)}_{motion}$$

and $$\underbrace{g(z_k|x_k, u_k)}_{observations}$$

which optimally display the problem. For this, it is essential to define states x to be estimated.

Block 401 denotes the particle filter $(X_{k-1}, u_k, z)$.

From block 403, jumps are made to block 405 until all values j=1:J have been run through.

In block 405, a new state is calculated:

$$X_k^{[j]} = f(X_k|X_{k-1}^{[j]}, u_k)$$

In block 407, the weight is calculated:

$$w_k^{[j]} = g(z_k, m_i|X_k, u_k)$$

When all values have been run through in block 403, a jump to block 409 occurs. From block 409, jumps are made to block 411 until all values i=1:J have been run through.

In block 411, a value according to $w_k^{[i]}$ is plotted.

In block 413, an addition is made to the particle set according to $x_k^{[i]} \to X_k$.

When all values have been run through in block 409, a jump to block 415 occurs, which represents the end $X_k$.

Figure 5:
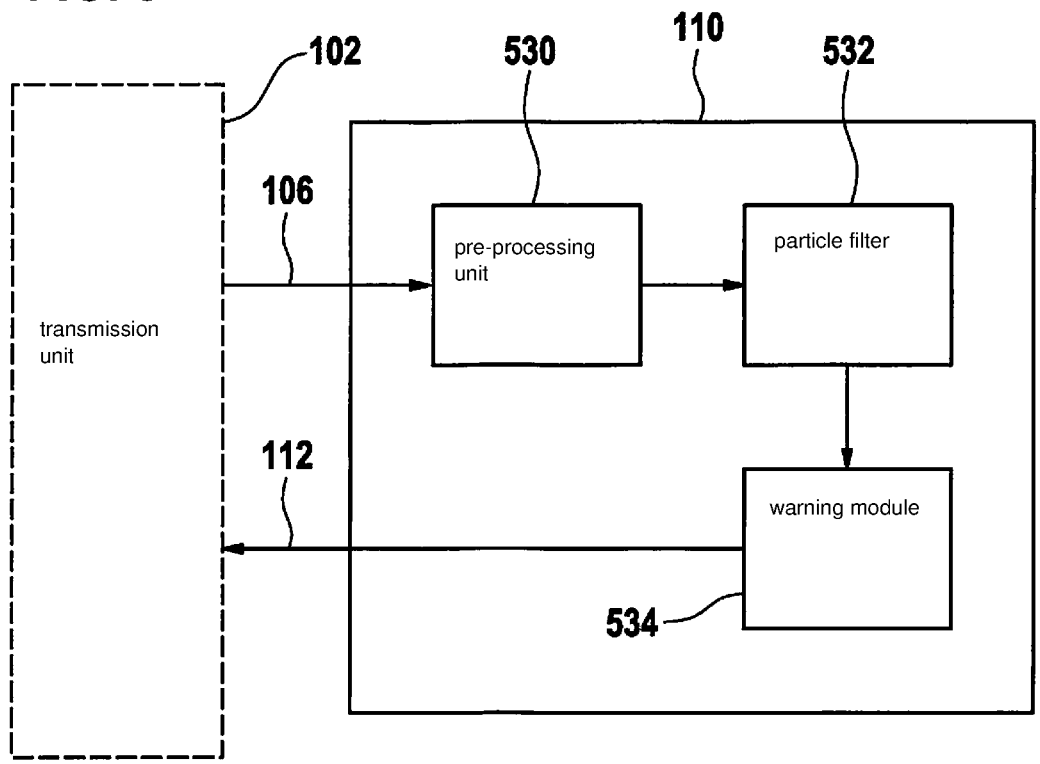
FIG. 5 shows a system for wrong-way driver detection according to one exemplary embodiment.

FIG. 5 shows a system for wrong-way driver detection according to one exemplary embodiment. The system includes units 102, for example in the form of the transmission units described based on FIG. 1, and a device 110 for wrong-way driver detection, which according to this exemplary embodiment is designed as a so-called WDW server. Device 110 is designed to receive data 106, for example measuring data described based on FIG. 1, from unit 102, and to provide a warning 112 based on data 106 and send them back to units 102, for example in the form of the wrong-way driving signal described based on FIG. 1.

The device includes a unit 530 for preprocessing, a particle filter 532 and a warning module 534.

Particle filter 532 is embedded in a simplified architecture of a cloud-based wrong-way driver warning as shown in FIG. 5.

Using particle filter 532, it is possible to approximately determine the probability distribution of the position of the car.

Figure 6:
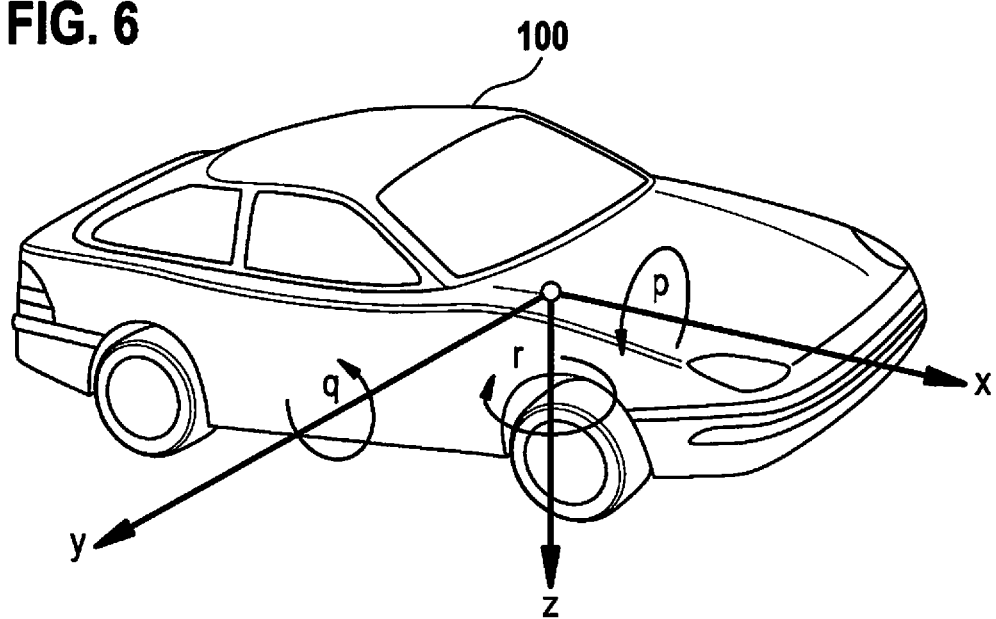
FIG. 6 shows a vehicle according to one exemplary embodiment.

Based on a vehicle 100, FIG. 6 shows values which may be incorporated into the model shown based on FIG. 5. The values may, for example, be states in the direction of longitudinal axis x, transverse axis y, vertical axis z and a rolling p about the longitudinal axis, a pitching q about the transverse axis, and a yawing r about the vertical axis.

With respect to a map matching using the particle filter, for the Bayes filter $p(x_k; z_{0|k}, u_{0:k})$ applies. With reference to FIG. 3, $x_k$ may denote what the state (not measured) is, for example the geographical longitude, latitude and altitude, $u_{k+1}$ may denote how car vehicle 100 is moving, for example with respect to the speed and rotation rates, and $z_k$ may denote what may be observed, for example a GPS signal or a signal regarding the surroundings of vehicle 100 (camera, etc.).

Figure 7:
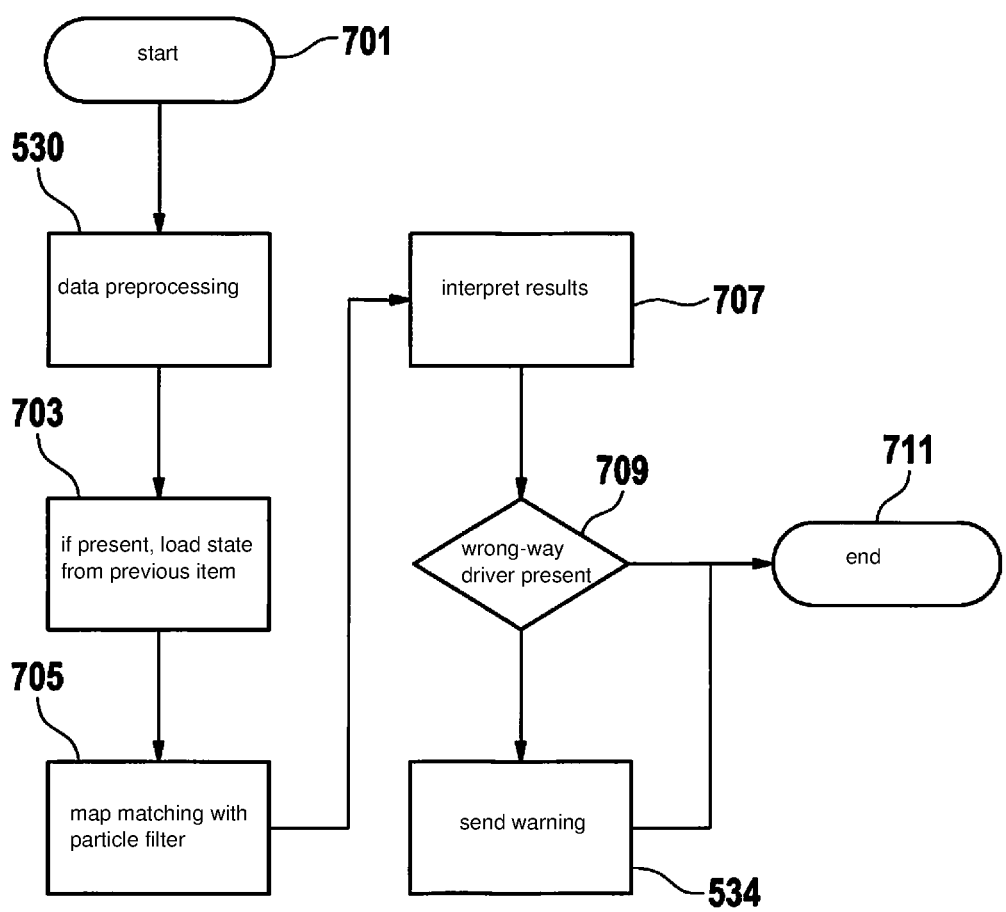
FIG. 7 shows a program sequence according to one exemplary embodiment.

FIG. 7 shows a program sequence according to one exemplary embodiment. The sequence starts with a block 701. In a block 530, a data preprocessing is carried out, as is described based on FIG. 5, for example. In a block 703, if present, the state from the previous item is loaded. In a block 705, a map matching with the particle filter takes place. In a block 707, an interpretation of the results takes place. In a block 709, it is checked whether a wrong-way driving is present. If this is the case, a warning is sent in a block 534, as is described based on FIG. 5, for example. If no wrong-way driving is present, the end of the program sequence takes place with a block 711.

Figure 8:
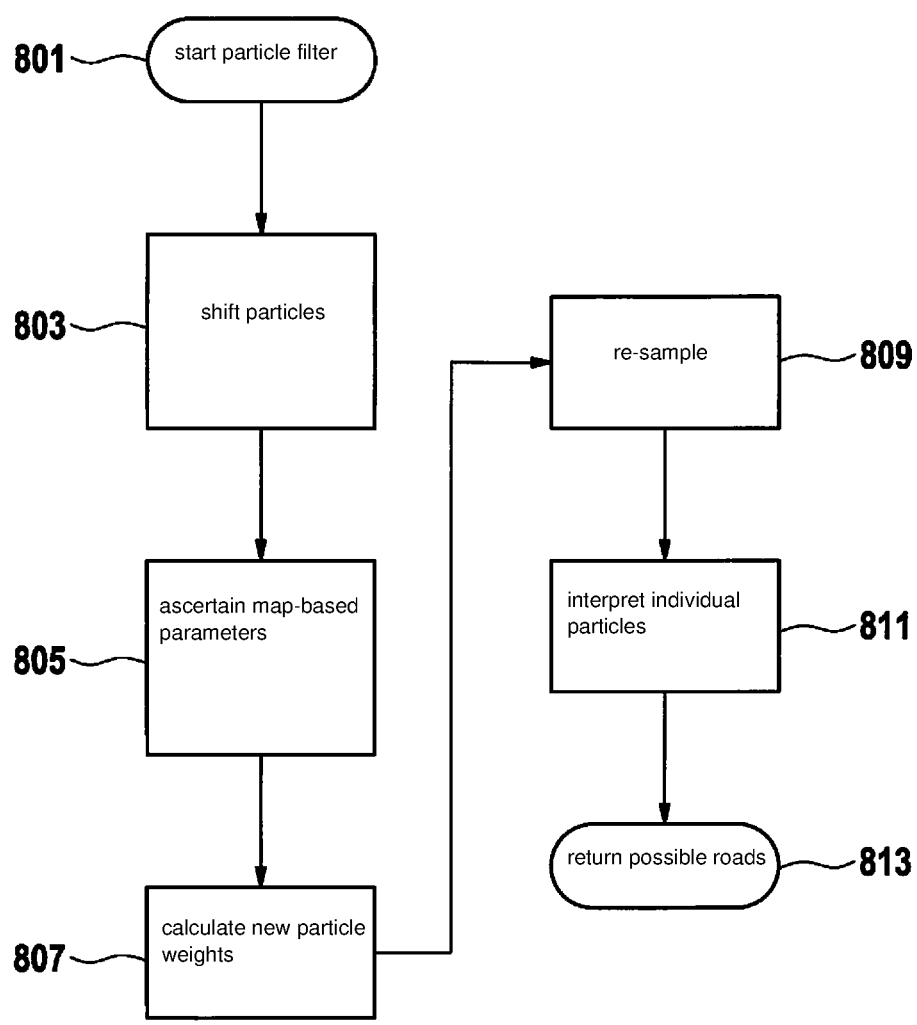
FIG. 8 shows a program sequence of a particle filter according to one exemplary embodiment.

FIG. 8 shows a program sequence of a particle filter according to one exemplary embodiment. A block 801 denotes a start of the particle filter. In a block 803, a shifting of the particles takes place, taking the sensor inaccuracy into consideration, for example of the sensor unit described based on FIG. 1. In a block 805, an ascertainment of the map-based parameters takes place. Such a parameter indicates, for example, whether a particle is situated on a road or what the name thereof is. In a block 807, a calculation of the new particle weights takes place. In a block 809, a so-called resampling takes place, in which the irrelevant areas and/or particles are eliminated. In a block 811, an interpretation of the individual particles takes place, and in a block 813, a return of the possible roads takes place, for example in the form of the at least one plausible road segment.

By using the particle filter, the aspects described below are improved. On the one hand, a sequentially (possible in real time) operating method is created, which primarily ascertains the instantaneous position on the road network. Furthermore, a robust estimation of the instantaneous position on the road network is possible. An uncertainty is ascertainable via the instantaneous estimation. This makes it possible to be able to reliably delay the decision about a potential wrong-way driving, to a useful degree.

Figure 9:
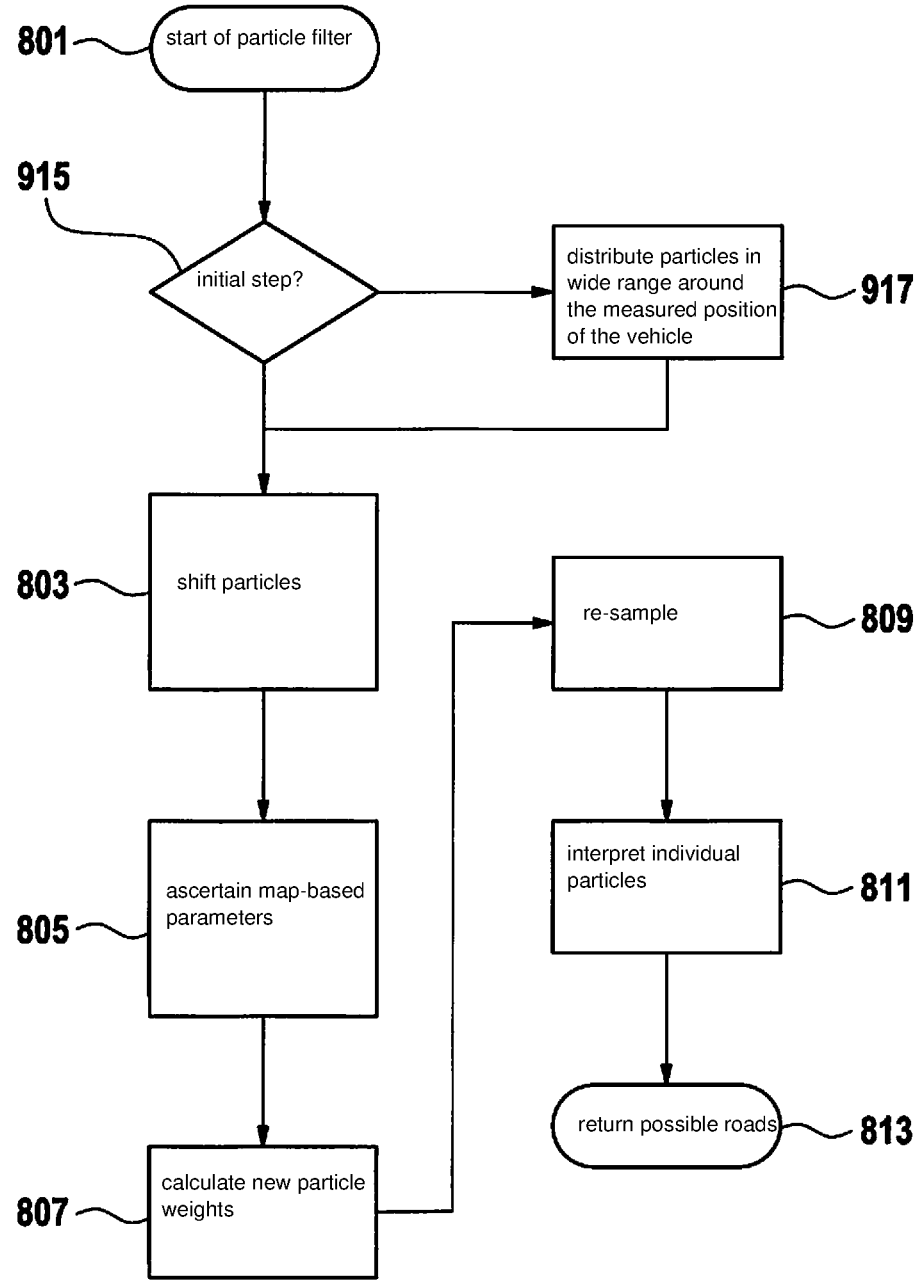
FIG. 9 shows a program sequence of a particle filter according to one exemplary embodiment.

FIG. 9 shows a program sequence of a particle filter according to one exemplary embodiment. The program sequence corresponds to the program sequence described based on FIG. 8, however additionally includes blocks 915, 917. In block 915, it is checked whether this is an initial step. If this is the case, particles are distributed in block 917 within a wide range around the measured position of the vehicle, for example around a GPS position. If this is not an initial step, a jump is made to block 803.

The typical use of a particle filter differs to the effect that, in the application described based on FIG. 9, the goal is not to achieve the best possible localization accuracy, but to ascertain, in all cases, the correct road elements. This means that, even if the sensor data indicate that a wrong-way drive is present, a warning should only be issued to the traffic at risk if there truly is certainty that a wrong-way drive in fact exists. For the fast and reliable detection of wrong-way drivers, the particle filter model will thus appear as described based on FIG. 9.

According to this exemplary embodiment, the particles determined in block 917 are shifted in block 803 with the uncertainty of the sensors. According to one exemplary embodiment, the particles are shifted based on the observations of rotation rate and speed. However, instead of using the sensor values, according to one exemplary embodiment random numbers (using the distribution of the error of the sensors—Gaussian here, to simplify matters) are added to the measured value. For this purpose, a so-called "moving theorem" may be applied.

Figure 10:
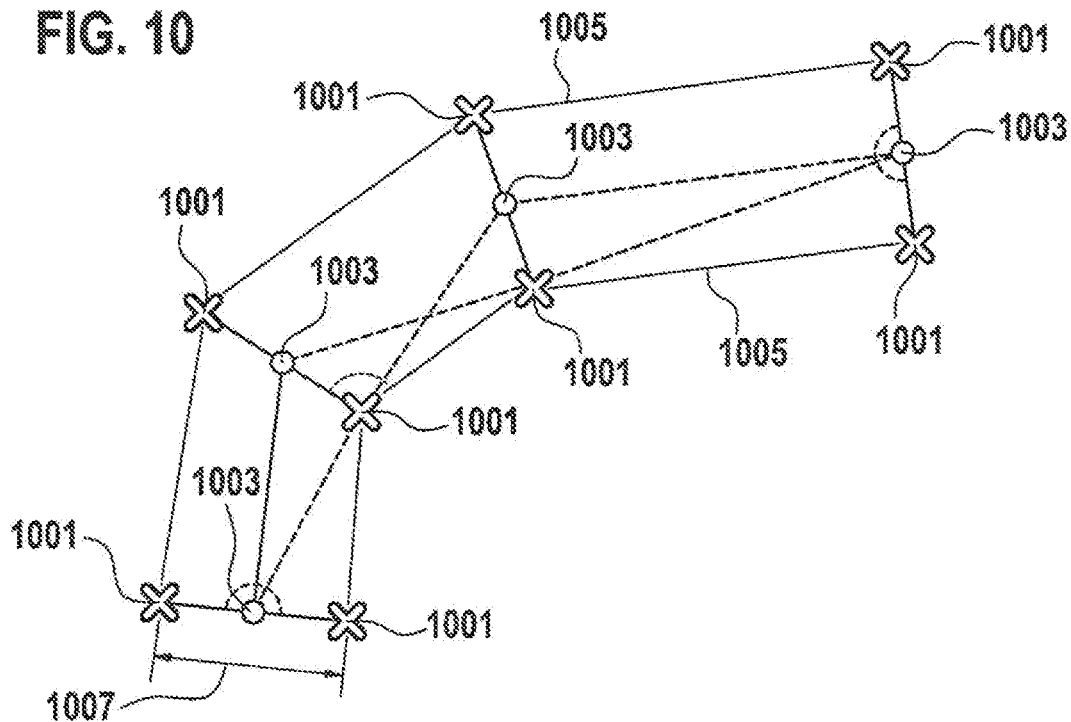
FIG. 10 shows a modeling of a map according to one exemplary embodiment.

In block 805, a map is spatially modeled, as is described hereafter based on FIG. 10. Thereafter, different parameters may be determined, for example whether a particle is situated on a road and what the heading, i.e., the driving direction of the road is. These parameters are later incorporated in the weighting of the particles, which is carried out in block 807.

In block 807, it is determined how high the probability of each particle is. It is pretended that the particle is the actual location, and it is checked how well it matches the observations. For example, does the heading of the particle coincide with that of the road or are these opposed. For a possible application and to increase the robustness, various factors have also been introduced here according to one exemplary embodiment.

In block 811, the individual particles are subsequently interpreted to determine the probability for the individual roads or road segments. This may take place by summation, for example.

For example, during the interpretation, the at least one plausible road segment may be ascertained as that road segment encompassed by the map data to which the largest number of particles may be assigned or to which the particles having the highest weighting may be assigned.

FIG. 10 shows the modeling of a map mentioned based on FIG. 9 according to one exemplary embodiment. Shown are corners 1001, so-called "shape points" 1003, and road delimitations 1005 of at least one road segment. Furthermore, a width 1007 of the road segment is shown, which results from the product of the lane width $d_i$ and the number of lanes $n_i$.

The shown model may be determined using the map data.

Figure 11:
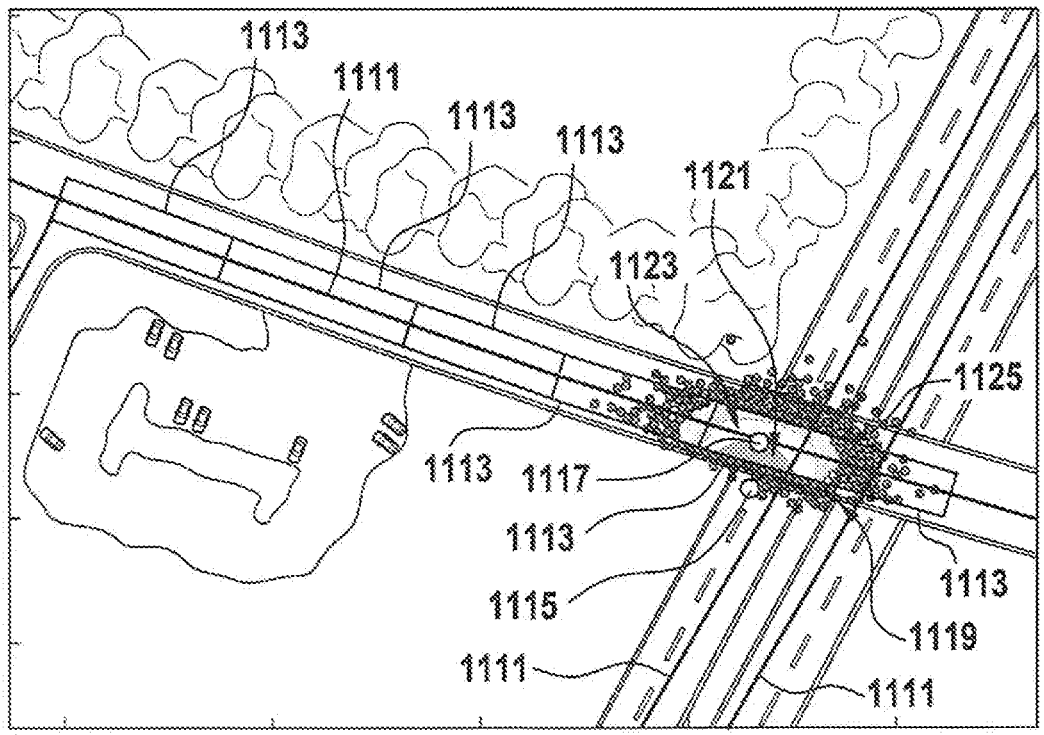
FIG. 11 shows a representation of a probability calculation according to one exemplary embodiment.

FIG. 11 shows a representation of a probability calculation according to one exemplary embodiment. Degrees of longitude are plotted on the horizontal axis, and degrees of latitude are plotted on the vertical axis. Shown is an image of a landscape including multiple roads 1111. For one of roads 1111, multiple of road segments 1113 mapping road 1111 are shown, for example in the form of road polygons.

Measured position 1115 represents a so-called "input position" which is used as an input value for the method described here. An instantaneous position 1117 is ascertained as a so-called estimated position by carrying out the method. For this purpose, a plurality of particles 1119 is used. Particles 1119 have different weightings ranging, for example, from "0", for unlikely, to "1," for very likely. By way of example, a central area 1121 is indicated in FIG. 11, in which particles 1119 having a high weighting, for example close to "1", are situated, a central area 1123 is indicated, in which particles 1119 having an average weighting, for example close to "0.5", are situated, and an outer area 1125 is indicated, in which particles 1119 having a low weighting, for example close to "0", are situated.

According to one exemplary embodiment, an exemplary calculation of probabilities according to one movement theorem having an intersecting expressway is shown based on FIG. 11.

Figure 12:
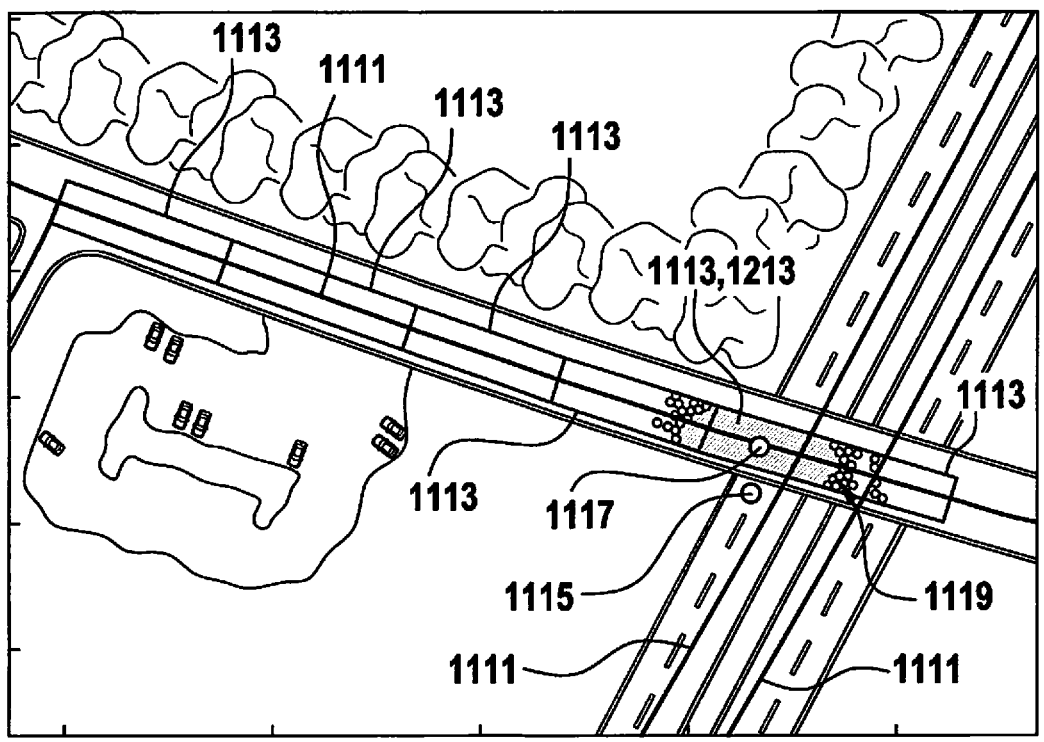
FIG. 12 shows a representation of particles after a resampling according to one exemplary embodiment.

FIG. 12 shows a representation of particles 1119 after a resampling according to one exemplary embodiment. Irrelevant particles were eliminated from the plurality of particles shown in FIG. 11. According to one exemplary embodiment, the irrelevant particles are those particles which are situated outside road segments 1113.

In the exemplary embodiment shown in FIG. 12, the majority of particles 1119 remaining after the resampling are situated in a road segment 1113, which is determined by a suitable interpretation of remaining particles 1119 as plausible road segment 1213. According to one exemplary embodiment, particles 1119 after a resampling with an intersecting expressway are shown based on FIG. 12.

If one exemplary embodiment includes an "and/or" linkage between a first feature and a second feature, this should be read in such a way that the exemplary embodiment according to one specific embodiment includes both the first feature and the second feature, and according to an additional specific embodiment includes either only the first feature or only the second feature.

What is claimed is:
1. A method comprising:
reading in position data via an interface, the position data representing a measured position of a vehicle obtained using a sensor;
reading in inaccuracy data indicating an inaccuracy of the position data that has been read in due to an accuracy deficiency of the sensor;
reading in map data mapping road segments negotiable by the vehicle;
ascertaining at least one plausible road segment using a particle filter and based on the position data, the inaccuracy data and the map data, the plausible road segment representing a road segment to which an instantaneous position of the vehicle is assignable; and determining whether the vehicle is driving in a wrong direction based on the ascertained at least one plausible road segment.

2. The method as recited in claim 1, further comprising: outputting a wrong-way driving signal based on a result of the determining being that the vehicle is driving in the wrong direction.

3. The method as recited in claim 1, wherein, in the step of ascertaining, a plurality of particles is determined, the plurality of particles being distributed around the measured position of the vehicle mapped by the position data, and each of the particles representing an assumed position of the vehicle and a weighting assigned to the assumed position.

4. The method as recited in claim 1, wherein the step of ascertaining includes:
determining a plurality of particles based on the read in position data and based on prior states of the vehicle, wherein the plurality of particles are distributed around the measured position of the vehicle as mapped by the position data, and wherein each of the plurality of particles represents a respective assumed position of the vehicle and a respective weighting assigned to the respective assumed position; and
determining a plurality of shifted particles by shifting the plurality of particles based on the inaccuracy data, wherein the at least one plausible road segment is ascertained based on the plurality of shifted particles.

5. The method as recited in claim 4, wherein, in the step of ascertaining, map-based parameters for the particles are determined using the map data, and the at least one plausible road segment is ascertained based on the map-based parameters.

6. The method as recited in claim 5, wherein, in the step of ascertaining, new weightings of the plurality of particles or of the plurality of shifted particles are determined using the map-based parameters.

7. The method as recited in claim 4, wherein, in the step of ascertaining, irrelevant particles are eliminated from the plurality of particles or the plurality of shifted particles.

8. The method as recited in claim 4, wherein, in the step of ascertaining, the plurality of particles or the plurality of shifted particles is interpreted to ascertain the at least one plausible road segment.

9. The method as recited in claim 1, wherein, in the step of reading in, the position data are read in via an interface of a processor cloud.

10. The method as recited in claim 1, wherein the ascertaining includes:
using the particle filter to:
determine a plurality of possible current states based on the measured position of the read in position data and to determine a respective weighting for each of the plurality of possible current states; and
plot, based on the determined plurality of states and their respective weightings, a plurality of particles;
shifting the plotted particles based on the inaccuracy of the position data as indicated by the read in inaccuracy data;
eliminating those of the plotted particles that do not overlay a road segment of a road on which presence of the vehicle is possible, resulting in a set of remaining plotted particles; and
identifying a road segment from a plurality of predefined road segments on which a majority of the set of the remaining plotted particles overlie.

11. A device comprising a processor configured to:
read in position data via an interface, the position data representing a measured position of a vehicle obtained using a sensor;
read in inaccuracy data indicating representing an inaccuracy of the position data that has been read in due to an accuracy deficiency of the sensor;
read in map data mapping road segments negotiable by the vehicle;
ascertain at least one plausible road segment using a particle filter and based on the position data, the inaccuracy data and the map data, the plausible road segment representing a road segment to which an instantaneous position of the vehicle may be may be assigned is assignable; and
determine whether the vehicle is driving in a wrong direction based on the ascertained at least one plausible road segment.

12. A system comprising:
at least one receiver that is (a) communicatively coupled to at least one transmitter situatable or situated in a vehicle and (b) designed to receive from the at least one transmitter position data, the position data representing a measured position of a vehicle obtained using a sensor; and
a device for wrong-way driver detection, the device including a processor that is configured to:
read in the position data using the at least one receiver, the position data representing a measured position of a vehicle obtained using a sensor;
read in inaccuracy data indicating an inaccuracy of the position data that has been read in due to an accuracy deficiency of the sensor;
read in map data using the at least one receiver, the map data mapping road segments negotiable by the vehicle;
ascertain at least one plausible road segment using a particle filter and based on the position data, the inaccuracy data, and the map data, the plausible road segment representing a road segment to which an instantaneous position of the vehicle is assignable; and
determine whether the vehicle is driving in a wrong direction based on the ascertained at least one plausible road segment.

13. A non-transitory machine-readable memory medium on which is stored a computer program that is executable by a computer and that, when executed by the computer, causes the computer to perform a method, the method comprising:
reading in position data via an interface, the position data representing a measured position of a vehicle obtained using a sensor;
reading in inaccuracy data indicating an inaccuracy of the position data that has been read in due to an accuracy deficiency of the sensor;
reading in map data mapping road segments negotiable by the vehicle;
ascertaining at least one plausible road segment using a particle filter and based on the position data, the inaccuracy data and the map data, the plausible road segment representing a road segment to which an instantaneous position of the vehicle is assignable; and
determining whether the vehicle is driving in a wrong direction based on the ascertained at least one plausible road segment.

* * * * *